Figure 1:
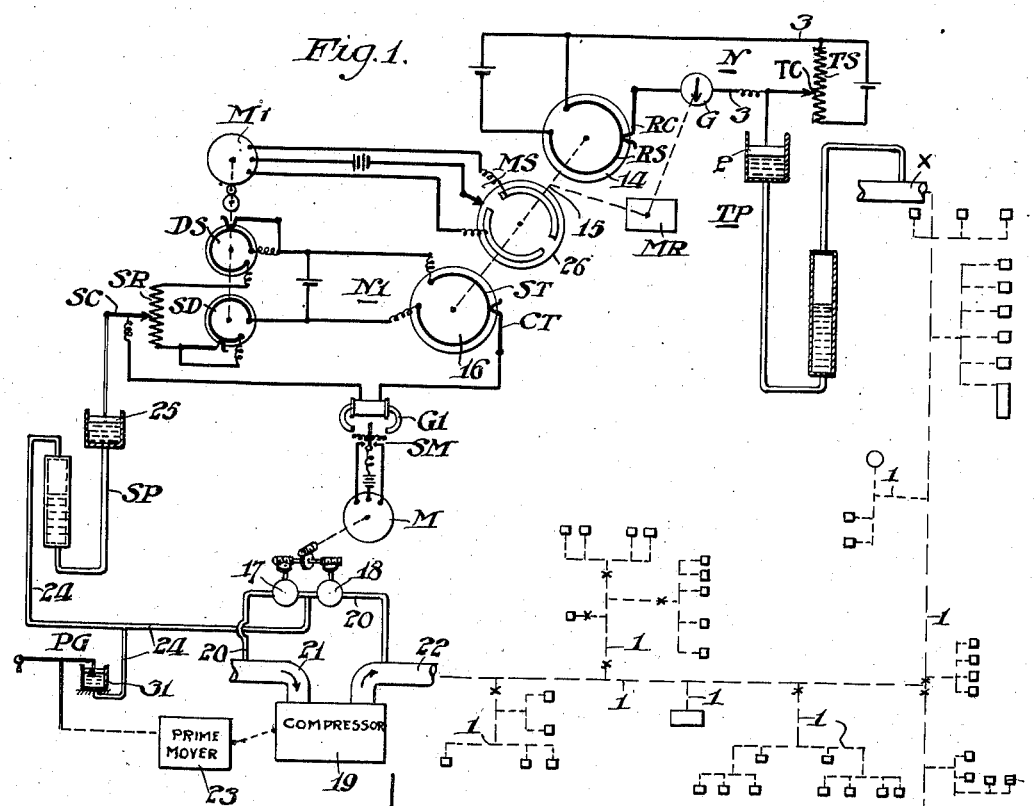

May 31, 1938. G. A. S. COOPER 2,119,223
CONTROL SYSTEM
Filed April 30, 1936 4 Sheets-Sheet 1

Inventor
George A. S. Cooper
By Cornelius D. Ehret
Attorney.

May 31, 1938.   G. A. S. COOPER   2,119,223
CONTROL SYSTEM
Filed April 30, 1936   4 Sheets-Sheet 2

Inventor
George A. S. Cooper
By Cornelius D. Ehret
Attorney.

Inventor
George A. S. Cooper
By Cornelius L. Ehret
Attorney

May 31, 1938.  G. A. S. COOPER  2,119,223
CONTROL SYSTEM
Filed April 30, 1936    4 Sheets-Sheet 4

Inventor
George A. S. Cooper
By Cornelius D. Ehret
Attorney.

Patented May 31, 1938

2,119,223

UNITED STATES PATENT OFFICE 2,119,223

CONTROL SYSTEM

George A. S. Cooper, Newark, N. J., assignor to Leeds & Northrup Company, Philadelphia, Pa., a corporation of Pennsylvania Application April 30, 1936, Serial No. 77,121

12 Claims. (Cl. 137—78)

My invention relates to systems for controlling the magnitude of a condition, as a fluid pressure, and particularly a remote or terminal pressure of a gas distribution system.

In gas distribution systems, it is essential from the standpoint of safety that the pressure at terminal points or points remote from the supply station of the system never be permitted to fall below a certain minimum magnitude. Heretofore, it has been the usual practice at a supply or pumping station to feed the gas to the distribution system at a rate substantially higher than that required to meet the expected consumption so that in event of a possible unforeseen demand or possible change in the time and duration of a peak load, the remote or terminal pressure would nevertheless remain above a safe minimum; to that end, the system pressure at the supply station usually was varied by an operator in accordance with a schedule based upon previous records of the pressures at various points in the distribution system, and such schedule always provided for maintenance of an excess pressure at the supply station, as mentioned above, to insure safe remote or terminal pressures in event of unforeseen contingencies. The additional cost of maintaining excess system pressure was felt justified as insurance against unsafe terminal or remote pressures.

In accordance with my invention, the pressure and variations in pressure at one or more remote or terminal points of the system are in effect reproduced at a supply station; immediately upon departure of a terminal pressure from normal, the input to the system from the supply station is quickly changed in the inverse sense to check further change in the terminal pressure, and thereafter the input to the system from the station is additionally varied, so long as there is departure of the terminal pressure from normal, in proper sense to return the terminal pressure to the desired magnitude.

More specifically, there is provided a self-balancing measuring network comprising a transmitter at a terminal point of the system and a receiver at the supply station; concurrently with adjustment of the measuring network for balance at the existing terminal pressure there is produced an unbalancing adjustment of a second normally balanced network including means operative upon unbalance thereof to change the input to the distribution system until the system pressure at the supply station is of such magnitude as to reestablish balance of the second network; however, this balance of the second network is not maintained if the terminal pressure is incorrect because of a second unbalancing adjustment of the second network which continues at slow rate so long as there is any departure of the terminal pressure from the desired magnitude. Thus a safe terminal pressure is insured without continuous supervision by an operator and without need to maintain an excess pressure substantially higher than necessary to insure safety under actual existing operating conditions.

My invention further resides in the methods, and in the features of combination and arrangement hereinafter described and claimed.

Figure 2:
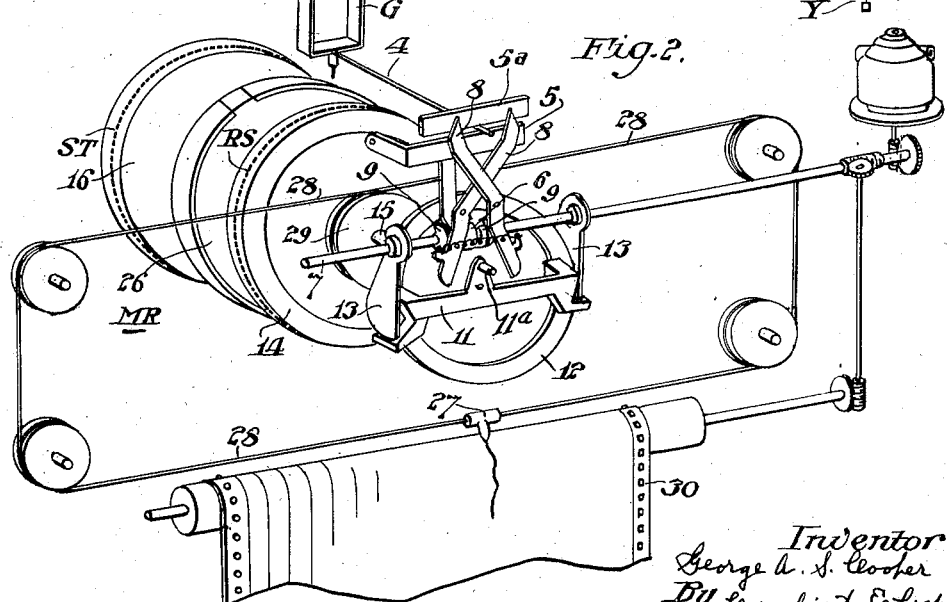
Figure 3:
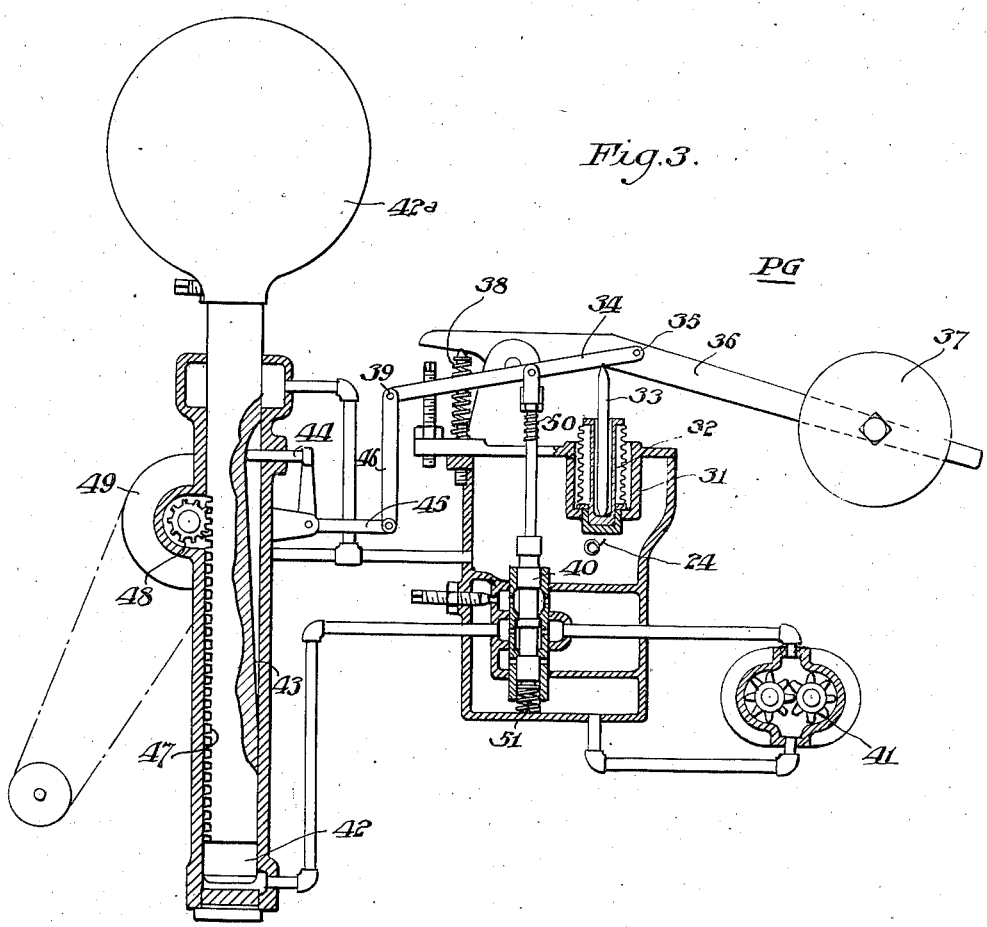
Figure 4:
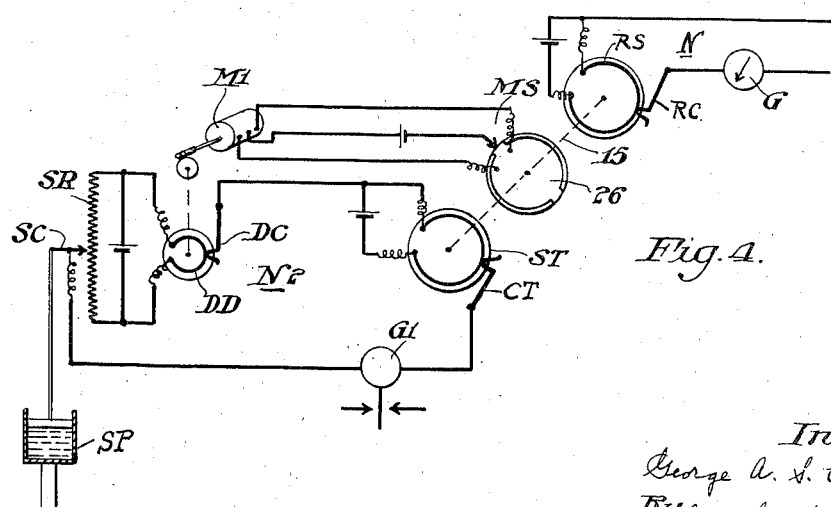
Figure 5:
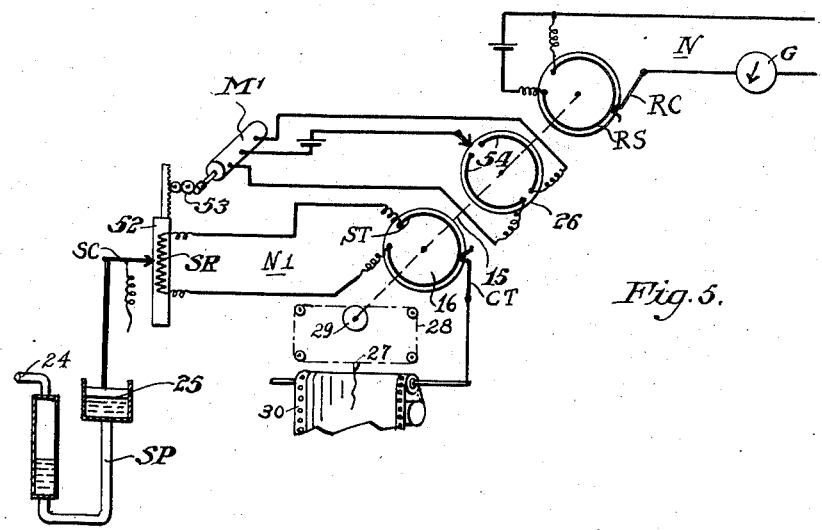
Figure 6:
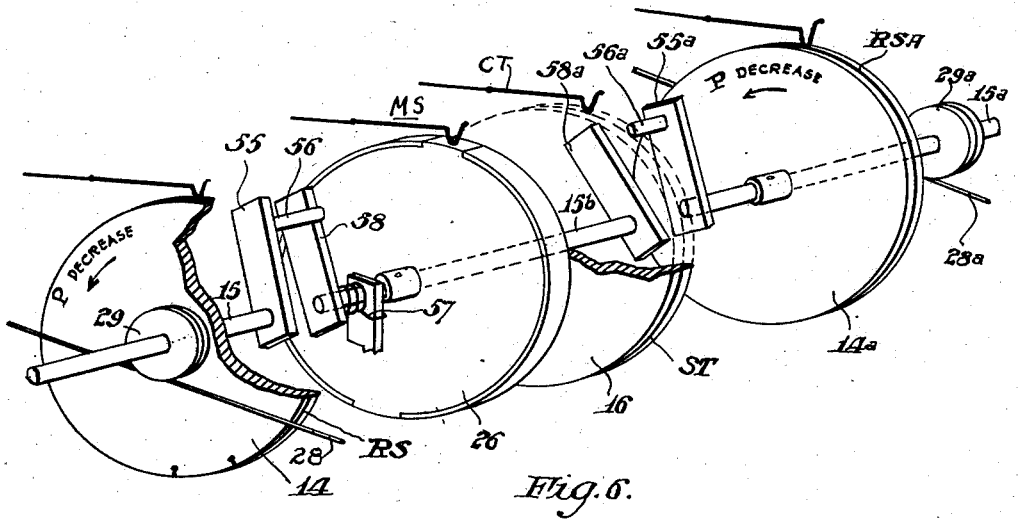
Figure 8:
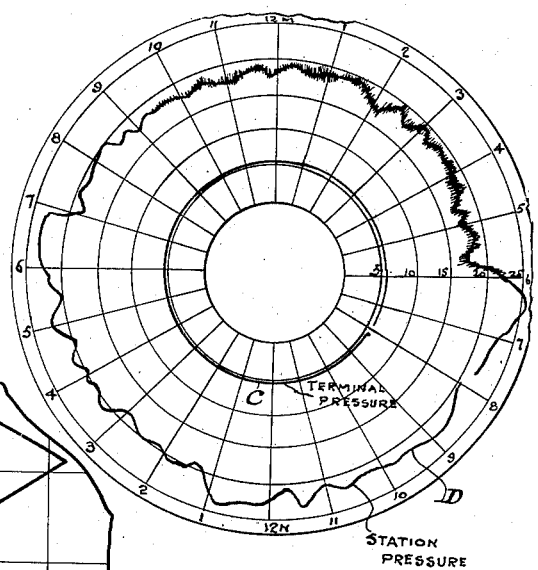
Figure 7:
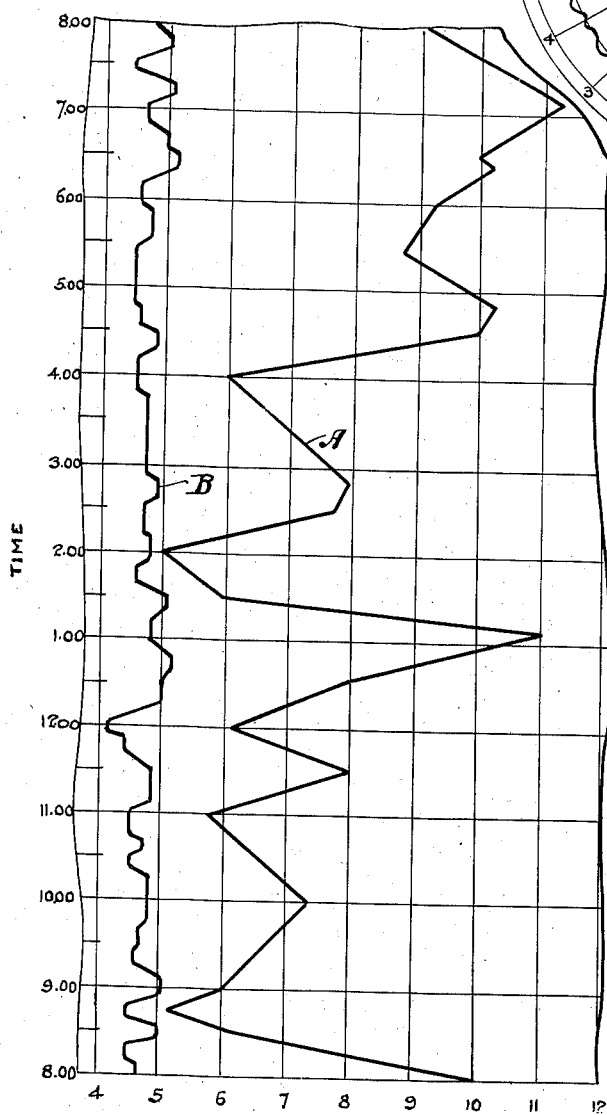

For an understanding of my invention and for an illustration of various forms thereof, reference is to be had to the accompanying drawings, in which:

Fig. 1 diagrammatically illustrates my control system as applied to a system of fluid distribution;

Fig. 2, in perspective, diagrammatically represents part of the control mechanism;

Fig. 3, partly in section, illustrates a pressure governor;

Figs. 4 and 5 diagrammatically illustrate modifications of a portion of the control system;

Fig. 6, in perspective, diagrammatically illustrates essential parts of a modification of the invention;

Figs. 7 and 8 show explanatory curves discussed in the description.

Referring to Fig. 1, the dash lines 1 represent a system of fluid distribution, specifically, a system for distributing gas to households and industrial plants, which may form a complex network extending over an area of many miles. At a point $x$ in the system, at which experience or tests indicate will exist the lowest pressure in the system, there is disposed a pressure-responsive device TP such as, for example, a manometer. The change in position of the manometer float 2 is utilized to adjust the position of a contact TC along a potentiometer slidewire TS, thus to produce a voltage or difference of potential whose magnitude is continuously representative of the terminal pressure of the system.

This voltage is transmitted by conductors 3 to a supply station for the system at which there is disposed a second potentiometer including a receiving slidewire RS. The galvanometer G, or equivalent, responds to any difference between the effective voltages of the potentiometers TS and RS to effect, through mechanism MR hereinafter more specifically described, adjustment of slidewire RS relative to its contact RC in proper sense to effect balance of the network N comprising the slidewires.

Referring to Fig. 2, the apparatus for effecting adjustment of the slidewire RS in response to unbalance of the network N may be generally of the type disclosed in Squibb Patent No. 1,935,732, to which reference is made for a more complete description of the construction and operation. Briefly, when the network N comprising slidewires TS, RS is unbalanced, the pointer 4 of the galvanometer G deflects to the right or left of its neutral position, depending upon the sense of unbalance of the network. Thereafter, in the cycle of operation, the clamping bar 5 is raised by cam 6 on the continuously rotating shaft 7 to clamp the pointer against the fixed clamping bar 5a in its deflected position; thereafter, the feelers 8 are released, by operation of cams 9, whereupon the spring 10 moves the feelers toward engagement with the clamped pointer. If the pointer is clamped while away from its neutral position, one or the other of the feelers, in moving toward the pointer, engages at its lower end the pin 11a extending from the movable clutch member 11 to adjust member 11 angularly in a sense and to an extent substantially corresponding to the sense and the extent of deflection of the pointer 4 from its neutral position. Subsequently, in the cycle of operation the clutch member 11 in its deflected position is brought into engagement with the driven clutch disk 12; thereafter, in the cycle one or the other of the cams 13 engages the clutch member 11 and restores it to the neutral position shown in Fig. 2. Since the clutch members are in engagement during the resetting of member 11, the driven clutch disk 12 is adjusted to an extent and in a direction primarily determined by the extent and sense of deflection of the galvanometer pointer 4 from its neutral position. Slidewire RS of the receiving potentiometer is carried by disk 14 mounted on the same shaft 15 to which the driven clutch member 12 is secured. Accordingly, upon a change in pressure at the terminal point, the network N is unbalanced because of the change in position of the contact TC of the transmitting slidewire. In response to the unbalance the galvanometer G deflects to effect, as above described, a rebalancing adjustment of the receiving slidewire RS. The adjustment of slidewire RS continues by intermittent steps, each substantially proportional to the existing unbalance of the network, until there is no longer any deflection of galvanometer G. It therefore appears that for every position of the contact TC at the transmitting station there is a corresponding position of the slidewire disk 14 and shaft 15 at the receiving or supply station. Furthermore, the disk 14 closely follows the change in pressure at the terminal point so that the rate of change of position of disk 14 substantially corresponds to the rate of change of the terminal pressure.

The motion of the control shaft 15 is utilized to effect relative adjustment between a third slidewire ST and its contact CT; specifically, upon shaft 15 there is mounted a disk 16 which carries the slidewire ST of a second normally balanced network N1. Upon a change in terminal pressure, the shaft 15 is operated, as above described, and in moving from a position corresponding to the normal or desired terminal pressure, it effects an adjustment of slidewire ST which unbalances the second network N1. The polarized relay G1, or equivalent, responds to the unbalance of network N1 to operate a switch SM to effect rotation of a motor M in one direction or the other depending upon the direction in which shaft 15 was rotated from its normal position. The rotation of the motor M effects a differential adjustment of the valves 17, 18 connected in series in a by-pass conduit 20 connected between the intake pipe 21 and the outlet pipe 22 of a compressor 19 or equivalent pressure-changing device. The pressure, in a section of the by-pass between the valves, utilized as a control pressure is communicated by pipe 24 to the governor PG for the prime mover 23 of the compressor. Accordingly, so long as the network N1 is unbalanced, the motor M operates to change the governor setting and, therefore, the compressor output to the distribution system.

The pressure tap 24 also extends to a pressure-responsive device SP, specifically a manometer, whose float 25 is suitably connected to the contact SC adjustable with respect to the slidewire SR of the network N1.

Though in the system specifically shown, the control pressure is derived from inlet and outlet pipes, it is to be understood the control pressure may be procured from any other suitable source.

With the system as thus far described, for each magnitude of pressure at the terminal of the system, there is a predetermined position of the slidewire ST of the network N1 which determines the position to which contact SC must be moved by the pressure-responsive device SP to rebalance the network N1 and this position of contact SC corresponds to a definite adjustment of a pressure-modifying device, specifically a motor-compressor unit.

Briefly reviewing the operation of the system as thus far described, immediately upon a change in the terminal pressure, the network N1 is unbalanced and begins to effect a change in the output of the compressor, thus to meet the load which is causing the drop in terminal pressure. So long as the terminal pressure is changing, the slidewire ST is adjusted through the mechanical relay mechanism MR to shift the position to which the contact SC must be moved to rebalance the network N1.

In a system of fluid distribution such as shown, there is a substantial time lag between the change in pressure at the supply station and change in pressure at the terminal point. Moreover, there is no fixed relation between the terminal pressure and the pressure at the supply station; for example, to maintain a terminal pressure of 5 pounds per square inch in a given system may require anywhere from say 10 to 35 pounds pressure at the supply station, depending upon the consumption, the distribution of consumption, and other factors. In order to maintain an adequate terminal pressure at all times despite these complications encountered in practice, in addition to the control elements above described, there is provided means which, so long as there is any departure of the terminal pressure from its desired value, effects a slow unbalancing adjustment of the second network N1 to effect a slow change of the station output in proper sense to restore the terminal pressure to the desired magnitude.

Specifically, in the arrangement shown in Fig. 1, there is disposed on the shaft 15 a third disk 26 carrying the fixed contacts of a reversing switch MS for the motor M1 which is mechanically coupled through a suitable speed-reducing means to the slidewires DS, SD included in the network N1. Specifically, the network N1 is a Wheatstone bridge; the portions of slidewire ST on opposite sides of contact CT constitute one pair of arms of the bridge, the third arm of the bridge includes the portion of resistance SR below contact SC and the effective portion of slidewire SD, and the fourth arm of the bridge includes the effective portion of the slidewire DS and that portion of slidewire SR above contact SC. The resistances DS, SD are differentially adjusted by motor MI, so that so long as shaft 15 is away from its neutral position the resistances of the aforesaid third and fourth arms of the bridge are slowly varied and thus slowly change the balance point of the network NI. Because of this additional control action, change of input to the system does not cease when the contact SC comes to the balance point determined by the position of slidewire ST with respect to contact CT unless at that time the terminal pressure is normal. If the terminal pressure is other than normal the network NI is slowly unbalanced by motor MI to effect a further change in the compressor output, and this change continues at slow rate until the terminal pressure is restored to the desired value.

Since the position of shaft 15 at all times corresponds to the terminal pressure, the movements of the shaft may be utilized to actuate a recorder pen, marker, or equivalent, or to operate an indicator or any other exhibiting means. Referring to Fig. 2, the recorder pen or stylus 27 is connected by cord 28 to the drum or pulley 29 secured to shaft 15 for movement with respect to the chart 30 which is driven at constant speed.

An operator may manually vary the input approximately to obtain the aforesaid results, although this would require constant supervision. For example, upon seeing the pointer 4 deflect in one direction or the other, the operator would change the governor setting of the compressor in proper sense until there was no deflection of the galvanometer pointer 4 or stepping of marker 27; he then would slowly change the governor setting until the marker 27, or other indicator, returned to the position corresponding to the desired terminal pressure. It is, however, far more satisfactory to perform this method automatically, as by the control apparatus above described, because the apparatus is capable of making the required adjustments with much greater nicety than a human operator.

The advantages of the new method, in contrast with the prior schedule control above mentioned, are apparent from typical performance curves shown in Fig. 7. The curve A shows the variation in terminal pressure occurring when the supply station output was controlled by an operator in accordance with a schedule based upon prior measurements of pressures at various points of the system. As apparent from curve A, the terminal pressure varied widely and for the entire time was much higher than necessary for safety; accordingly, the pumping cost was higher than necessary. Curve B shows that with the control system of Fig. 1, the maximum variation in pressure was less than about ½ lb. from the control point, 4.8 lbs.; the terminal pressure was at all times adequately high for safety and yet was never maintained so high as materially to add to pumping costs.

The chart of Fig. 8 clearly illustrates the ability of the control system of Fig. 1 to insure that the terminal pressure at all times is not less than an adequately safe minimum. The inner curve C shows that the terminal pressure remains substantially constant at 5 lbs. per square inch, never falling perceptibly below that value and never rising to more than about 5½ lbs.; the outer curve D illustrates the variation of pressure at the supply station effected by the control system to maintain the aforesaid terminal pressure.

In the foregoing description of the system, it is stated that the pressure derived by the adjustment of valves 17 and 18 is applied to the pressure governor of the prime mover for the compressor. In Fig. 3 there is illustrated a known type of pressure-governor suited for use in the control system of Fig. 1. The pipe 24, for transmitting the control pressure, is connected to chamber 31 containing a collapsible bellows or syphon 32. A rod 33 extends from the movable end of the bellows 32 to a lever 34 pivotally connected at 35 to the arm 36 biased by weight 37, and spring 38. Assuming an increase in pressure in pipe 24, the arm 36 is raised and since the pivot 39 of lever 34 is at this time stationary, the operating rod for valve 40 is lifted to permit a pressure produced by pump 41, continuously driven by the prime mover 23, to be applied to the lower side of piston 42 which is biased to its lower position as by weight 42a. As the piston 42 rises, its cam surface 43, through pin 44, bell-crank lever 45 and link 46, causes the pivot point 39 of lever 34 to drop to reset valve 40 to its neutral position. The rack 47, movable with piston 42, engages the pinion 48 to whose shaft is secured the drive wheel or sprocket 49 whose angular movement may be utilized to change the cut-off of prime mover 23, or to change the effective clearance of the compressor cylinders, or to operate a throttle valve of the prime mover, or to operate a pressure-reducing valve in the supply line to the distribution system. In the last-mentioned case, it is assumed that the gas in the supply line is at a pressure higher than the pressure required in the distribution system, in which event the motor-compressor unit is dispensed with, pump 41 driven by any suitable motor, and drive-wheel 49 connected to the operating member of the valve.

Upon a drop in pressure in the control line 24, a reverse sequence of operation takes place. Briefly, the arm 36 falls to permit liquid beneath piston 42 to escape, and the downward movement of the piston permits pivot 39 of arm 34 to be raised under the influence of springs 50, 51 to shut off the pilot valve. Therefore, for each magnitude of pressure in line 24, there is a definite position of plunger 42 and a corresponding definite position of the control member coupled to wheel 49.

In the system shown in Fig. 1, the control network NI is a Wheatstone bridge; however, any other suitable type of balanceable system or network may be employed. Specifically, as shown in Fig. 4, the slidewires ST and SR may be comprised in a potentiometer network: although it is possible in such a system to use two slidewires such as DS and SD of Fig. 1 for effecting a slow variation in station output so long as the terminal pressure is other than normal, it is also possible and simpler, as shown in Fig. 4, to use a single slidewire DD for this purpose. The slidewires SR and DD comprise a split circuit potentiometer whose output voltage is dependent upon the positions of contacts SC and DC with respect to their corresponding slidewires. The operation of the system is generally the same as the operation of the system of Fig. 1.

In the modification shown in Fig. 5, the auxillary slidewires SD and DS, of Fig. 1, and the auxiliary slidewire DD, of Fig. 4, are omitted and in lieu thereof the slidewire SR is carried by a member 52 connected through suitable speed-reducing means 53 to the motor MI.

Also as illustrated by this figure, instead of using a reversing switch MS to control motor MI, there may be employed a split rheostat 54 mounted upon the disk 26. So long as shaft 15 is away from its normal position, the motor MI operates in proper direction to return the terminal pressure to normal and at a speed which is the greater the larger the existing departure of terminal pressure from normal. This feature, of course, may be utilized in the system of Fig. 1 or of Fig. 4 simply by the substitution of the split rheostat of Fig. 5 for switch MS.

It is characteristic of some systems of distribution that under varying conditions of system consumption the point of lowest pressure in the system will shift from one remote or terminal point, such as X in Fig. 1, to another remote or terminal point, such as Y. Under such circumstance, the control of the output of the supply station should be shifted from terminal point X to terminal point Y. In Fig. 6 are shown the essentials of an arrangement suitable to perform such selective control action. To the shaft 15 of the recorder-controller associated with the terminal point X is secured an arm 55 carrying a stop 56. A similar recorder-controller, responsive to variations in pressure at the terminal point Y, is provided with an arm 55a secured to its shaft 15a. The disks 16 and 26, for carrying the slidewire CT of the control network NI, and the reversing switch or split rheostat for motor MI, are carried by a separate shaft 15b continuously biased, as by spring 57, for movement in clockwise direction, as viewed in Fig. 6. The positions of slidewire CT and of disk 26, which, as in Fig. 1, control the station input to the system, are therefore, at all times, determined by the lower of the terminal pressures.

With the parts in the position shown in Fig. 6, the terminal pressure at point X is lower and the position of disks 16 and 26 is controlled by engagement of arm 58 with stop 56. If the pressure at terminal point Y falls below that of terminal point X, the position of the slidewire and motor control disks 16 and 26 is determined by engagement of arm 58a with stop 56a. If, from experience with a particular system, it is found that terminal pressures at more than two points in the system need to be guarded, the arrangement of Fig. 6 can be expanded so that, under all conditions, the input at the supply station will be regulated to maintain an adequately safe pressure at the point of lowest pressure in the system.

Though the control systems described are particularly of value for use in connection with systems for distribution of gas, they may also be employed to advantage in systems for distributing liquids, as water or oil.

While preferred modifications have been described and illustrated, it is to be understood my invention is not limited thereto but is coextensive in scope with the appended claims.

What I claim is:

1. In a fluid distribution system, a member at a supply station for said system movable in response to changes in magnitude of the pressure at a remote point of said system, a normally balanced control system, means included in said control system adjusted by said member to unbalance said control system, means responsive to unbalance of said control system to change the input from said station to said distribution system, means included in said control system responsive to change in said input to effect rebalance of said control system, and means for unbalancing said control system so long as there is departure of said member from a position corresponding to the desired magnitude of pressure at said remote point.

2. In a fluid distribution system, means for producing, at a supply station for said system, effects representative of the variations in pressure at a remote point of said system and of the departure of said pressure from a desired magnitude, and means at said station responsive to said effects rapidly to change the input to said system from said station upon departure of the pressure at said remote point from said desired magnitude to check further departure and slowly to change the input to said system from said station, so long as there is departure from normal of the pressure at said remote point, in sense to restore the pressure at said terminal point to normal.

3. In a fluid distribution system, a member at a supply station for said system movable in response to changes in magnitude of the pressure at a remote point of said system, a normally balanced control system unbalanced by movement of said member from a neutral position, means responsive to unbalance of said control system to change the output of said station, means in said control system responsive to changes in output of said station, and means for slowly unbalancing said control system so long as there is departure of said member from its neutral position.

4. In a fluid distribution system, a normally balanced electrical network comprising a transmitter at a remote point of said system and a receiver at a supply station for said system, means at said remote point for unbalancing said network upon change in magnitude of the pressure at said point, means at said supply station responsive to unbalance of said network, structure actuated by said responsive means to rebalance said network at the existing magnitude of said condition, a second normally balanced electrical network, means included in said second network operated concurrently with said structure to effect unbalance of said second network, means responsive to unbalance of said second network, means actuated by said responsive means to vary the input from said supply station to said system and to effect rebalancing adjustment of said second network, and means for additionally unbalancing said second network so long as the balance point of said first network does not correspond to the desired magnitude of said pressure.

5. In a fluid distribution system, structure at a supply station for said system movable from a neutral position in accordance with the departure from a desired value of the pressure at a remote point of said system, a normally balanced electrical network including an impedance-varying element movable with said structure, a second impedance-varying element, for said network, a motor for operating said second element, control means for said motor movable with said structure, a third impedance-varying element, for said network, means for adjusting said third element and for varying the input from said station to said system, and means responsive to unbalance of said network for effecting operation of said adjusting means.

6. In a fluid distribution system, a member at a supply station for said system adjustable to vary the input from said station to said system, a member at said supply station movable in response to the changes in pressure at a remote point of said system, means at said station responsive to changes in position of said second member to effect adjustment of said first member in sense to effect restoration of the pressure at said remote point to a desired magnitude, and means at said station operative to effect additional adjustment of said first member so long as there is departure of said second member from a position corresponding to the desired pressure at said remote point.

7. In a fluid distribution system, a member at a supply station for said system adjustable to vary the input to said system from said station, a normally balanced network, means responsive to unbalance of said network for effecting adjustment of said member, and means for determining the balance conditions of said network comprising an impedance-varying element positioned in accordance with the existing pressure at a remote point of said system, an impedance-varying element positioned in accordance with the input at said station, and an impedance-varying element adjusted so long as there is departure of said first element from a position corresponding to the desired pressure at said remote point.

8. In a fluid distribution system, a motor-compressor unit at a supply station for said system, means adjustable to vary the input to said motor, a member at said station movable in response to changes in pressure at a remote point of said system, means at said station responsive to changes in position of said member to actuate said adjustable means in sense toward restoration of the pressure at said remote point to a desired magnitude, and means at said station operative to effect additional operation of said adjustable means so long as there is departure of said member from a position corresponding to said desired magnitude of pressure.

9. In a fluid distribution system, a motor-compressor unit at a supply station for said system, means adjustable to vary the input to said motor, a normally balanced network, means responsive to unbalance of said network for effecting actuation of said adjustable means, and means for determining the balance conditions of said network comprising an impedance-varying element movable in response to changes in magnitude of the pressure at a remote point of said system, an impedance-varying element positioned in accordance with said adjustable means, and an impedance-varying element adjusted so long as there is departure of said first element from a position corresponding to the desired pressure at said remote point.

10. A gas distribution system comprising a supply station, a distribution network from said station including branches through which the flow and variations in flow are unpredictable, a pressure-responsive device connected to a remote point of said network at which the gas pressure depends upon the gas pressure at said station and upon the flow through said branches, means at said supply station controlled by said pressure-responsive device promptly to change the station pressure upon change in pressure at said remote point in sense and to an extent determined by the change in terminal pressure, and means for compensating for the unpredictable variable effect upon the pressure at said remote point of the flow through said branches of the network comprising means slowly to vary the station pressure, so long as the pressure at said remote point is other than the desired safe magnitude, in sense to restore the pressure at said remote point to the desired magnitude.

11. A gas distribution system comprising a supply station, a distribution network from said station including branches through which the flow and variations in flow are unpredictable, a pressure-responsive device connected to a remote point of said network at which the gas pressure depends upon the pressure at said supply station and upon the flow through said branches, a balanceable electrical network including an impedance adjusted by said pressure-responsive device, an impedance at said station and means responsive to unbalance of said electrical network for adjusting said second impedance to rebalance said electrical network at the existing pressure at said remote point, a second balanceable network comprising an impedance adjusted concurrently with said second-named impedance, means responsive to unbalance of said second electrical network to vary the station pressure and an impedance adjusted in accordance with change of station pressure to rebalance said second electrical network at the existing pressure at said remote point, and means for compensating for the unpredictable variable effect upon the pressure at said remote point of the flow through said branches of the gas distribution network comprising means for slowly unbalancing said second electrical network so long as the adjustable element of said second-named impedance is away from the position corresponding to the desired pressure at said remote point.

12. A gas distribution system comprising a supply station, a distribution line from said station including branches through which the flow and variations in flow are unpredictable, a pressure-responsive element connected to a remote point of said network at which the gas pressure depends upon the gas pressure at said supply station and upon the flow through said branches, means at said supply station for reproducing the position and changes in position of said pressure-responsive device, a balanceable electrical network comprising an impedance adjusted by said position-reproducing means, means responsive to unbalance of said electrical network for varying the station pressure and means responsive to station pressure for effecting balance of said electrical network when the change in station pressure corresponds to the adjustment of said impedance, and means for compensating for the unpredictable variable effect upon the pressure at said remote point of the variations of the flow through said branches of the distribution network comprising means energized, so long as said position-reproducing means is away from the position corresponding to the desired pressure at said remote point, slowly to unbalance said electrical network.

GEORGE A. S. COOPER.